(12) United States Patent
McClure

(10) Patent No.: US 6,857,875 B1
(45) Date of Patent: Feb. 22, 2005

(54) ARTIST'S COLOR CHART DEVICE

(76) Inventor: Randal G. McClure, P.O. Box 99, McClellanville, SC (US) 29458

(\*) Notice: Subject to any disclaimer, the term of this patent is extended or adjusted under 35 U.S.C. 154(b) by 0 days.

(21) Appl. No.: 10/783,177

(22) Filed: Feb. 20, 2004

(51) Int. Cl.$^7$ ............................................. G09B 11/00
(52) U.S. Cl. ............................ 434/81; 434/84; 434/98
(58) Field of Search ........................... 434/81, 84, 87, 434/97, 98, 99, 100, 102, 103

(56) References Cited

U.S. PATENT DOCUMENTS

| | | | |
|---|---|---|---|
| 32,159 A | * | 4/1861 | Nisbet .......................... 29/415 |
| 824,374 A | | 6/1906 | Munsell |
| 2,007,264 A | * | 7/1935 | Allen ........................... 434/98 |
| 2,221,774 A | * | 11/1940 | Bowser ........................ 434/99 |
| 2,359,195 A | | 9/1944 | Berliner et al. |
| 2,608,771 A | | 9/1952 | Sparks |
| 2,629,185 A | * | 2/1953 | Mulrane ..................... 434/104 |
| 2,866,277 A | | 12/1958 | Wise |
| 2,878,590 A | | 3/1959 | Dodge |
| 3,474,546 A | | 10/1969 | Wedlake |
| 3,751,829 A | | 8/1973 | Foss |
| 3,777,414 A | | 12/1973 | Robinson |
| 3,815,265 A | | 6/1974 | DePauw |
| 3,856,136 A | | 12/1974 | Governale |
| 3,943,643 A | | 3/1976 | Fisher et al. |
| 4,211,016 A | | 7/1980 | Eldar |
| 4,337,046 A | | 6/1982 | Anderson et al. |
| 4,510,729 A | * | 4/1985 | Syring ....................... 52/745.09 |
| 4,541,801 A | | 9/1985 | Mackert et al. |
| 4,604,062 A | * | 8/1986 | Woods ......................... 434/88 |
| 4,992,050 A | | 2/1991 | Edwards |
| 5,031,333 A | * | 7/1991 | Shelley ........................ 33/562 |
| 5,105,551 A | * | 4/1992 | McCutchen et al. .......... 335/63 |
| 5,209,664 A | | 5/1993 | Wilcox |
| 5,447,057 A | * | 9/1995 | Shaw et al. .................... 73/86 |
| 5,484,637 A | | 1/1996 | Paragon et al. |
| 5,842,866 A | | 12/1998 | Chow |
| 6,219,930 B1 | * | 4/2001 | Reid ........................... 33/562 |
| 6,254,955 B1 | | 7/2001 | Kuo et al. |
| D484,911 S | * | 1/2004 | Gorman ...................... D19/40 |
| 6,702,559 B1 | * | 3/2004 | Norman ....................... 425/65 |

\* cited by examiner

*Primary Examiner*—Kurt Fernstrom
(74) *Attorney, Agent, or Firm*—Harleston Law Firm, LLC; Kathleen M. Harleston

(57) ABSTRACT

An artist's color device includes: (a) a board portion having a paintable upper surface; (b) a flexible, removable, disposable, peel-off upper sheet portion with an adhesive on its lower face, which is removably attachable to the board portion's upper surface; and (c) a number of similarly shaped apertures arranged in spaced apart rows and columns in the upper sheet portion. Also included herein is a method of using an artist's color chart device, including the steps of: (a) painting in the outlined shapes on the board portion, which are exposed by the apertures, with a related series of graduated color values within each column, with a different color series in each of the columns; (b) detaching the upper sheet portion from the board portion and disposing of it; and (c) allowing the painted board portion to dry.

20 Claims, 8 Drawing Sheets

ARTIST'S COLOR CHART DEVICE

BACKGROUND OF THE INVENTION

1. Technical Field

The present invention relates to an artist's color chart device for assisting a painter in making color charts.

2. Background Information

Art students are often asked to create a series of color charts as an immediate learning experience and as a reference tool for periodic use throughout their careers. Making color charts is a systematic process that teaches the student about color. After having worked on a set of color charts, the art student can usually predict with greater accuracy what X amount of a dominant color plus Y amount of a selected color with the subsequent addition of white will look like on the canvas or other painting surface. These color charts are used by the student as a training tool or, later on, by the more experienced artist to see color more accurately. Art students often retain their color charts for years, pulling them out periodically to refresh their recollection. Normally an art student will create about a dozen color charts, each with a different dominant color. The completed color charts may serve as a reference throughout an artist's career.

However, making color charts conventionally is a tedious task. First, the art student must purchase the right supplies, and then paint small, evenly spaced squares on Masonite boards using a paint brush or a palette knife, for example. Usually, the student must be taught how to apply tape strips to each board, leaving appropriately sized squares for receiving the chosen paints in prescribed proportions. The art student then gradually adds the selected dominant color to the other colors of a chosen group of colors (the palette) in a specific orderly fashion and, with the addition of white paint, gradually lowers the value mixture down the column, painting each color value in the appropriate square. A different colored paint may be substituted for white to lower the value, but white is preferred. Once the student has applied the various values to the squares, he or she removes and discards the tape, which is a messy task, and sets the painted board out to dry. This must be repeated twelve or so times, depending on the number of colors in the student's palette or the number of boards being included in the student's set.

Although most art students enjoy the painting part of this process, most of them dislike procuring the appropriate supplies, taping the boards, and, later, removing the messy tape. Thus, there is a need for an artist's color chart device that will assist art students in the production of color charts and make the color chart production process less time consuming, easier, neater, and more satisfying.

BRIEF SUMMARY OF THE INVENTION

The present invention is a color chart device for assisting an artist in making color charts, which comprises:

(a) a board portion having a paintable upper surface;

(b) a flexible, removable, disposable, peel-off upper sheet portion comprising an adhesive on its lower face, the upper sheet portion being removably attachable to the upper surface of the board portion; and (c) a plurality of similarly shaped apertures arranged in a plurality of spaced apart rows and generally vertical columns in the upper sheet portion. Preferably, the upper sheet portion is transparent or translucent, and generally has the same shape as the board portion.

The color chart device herein preferably further includes a number of spaced apart, outlined shapes marked on the upper surface of the board portion, with the apertures in the upper sheet portion having substantially the same shape and arrangement as the outlined shapes. In this embodiment, the apertures overlay the outlined shapes when the upper sheet portion is attached to the board portion.

Additionally, the upper sheet portion may be perforated or otherwise divided between the columns into peel-off strips, so that a strip may be removed once the artist has completed painting the shapes in a particular column or group of columns. Also, the color chart device of the present invention may include a removable transparent cover panel over the disposable upper sheet portion to protect the painted shapes once the upper sheet portion is removed.

An alternate, generally circular color chart embodiment herein includes apertures, preferably rectangles or ovals, that gradually decrease in size toward the center of the color chart. One generally circular, aesthetically pleasing color chart embodiment herein has a hole at the center for the artist to insert his or her fingers and hold the chart while painting it, if desired.

Also included herein is a method of making a color chart device, comprising the steps of:

(a) optionally, removably attaching an upper sheet portion to a board portion so that a plurality of apertures on the upper sheet portion correspond to and overlay a plurality of corresponding outlined shapes on the board portion, the apertures and the outlined shapes being in the same arrangement of spaced apart rows and generally vertical columns as one another;

(b) painting in the outlined shapes on the board portion, which are exposed by the apertures, with a related series of graduated color values within each column, with a different color series in each of the columns;

(c) detaching the upper sheet portion from the board portion and disposing of it; and (d) allowing the painted board portion to dry.

Advantages of the instant color chart device include: assisting art students in the production of useful, durable color charts; and making the color chart production process less time consuming, easier, neater, and more satisfying. The adhesive on the lower face of the upper sheet portion adheres the upper sheet portion to the board portion; therefore, bleeding of the paint onto the board portion is minimized. The perforated lines in the upper sheet portion allow the user painting the color chart to take a break between sections, if desired. The optional cover panel protects the painted surface of the board portion once the upper sheet portion has been removed. Lastly, the generally circular-shaped color chart embodiment herein, which includes outlined shapes that gradually decrease in size toward the center of the color chart device, allows the student user to learn scale in addition to color. The optional hole in the center of the circular color chart embodiment allows the artist user to hold the color chart while painting it, if desired.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
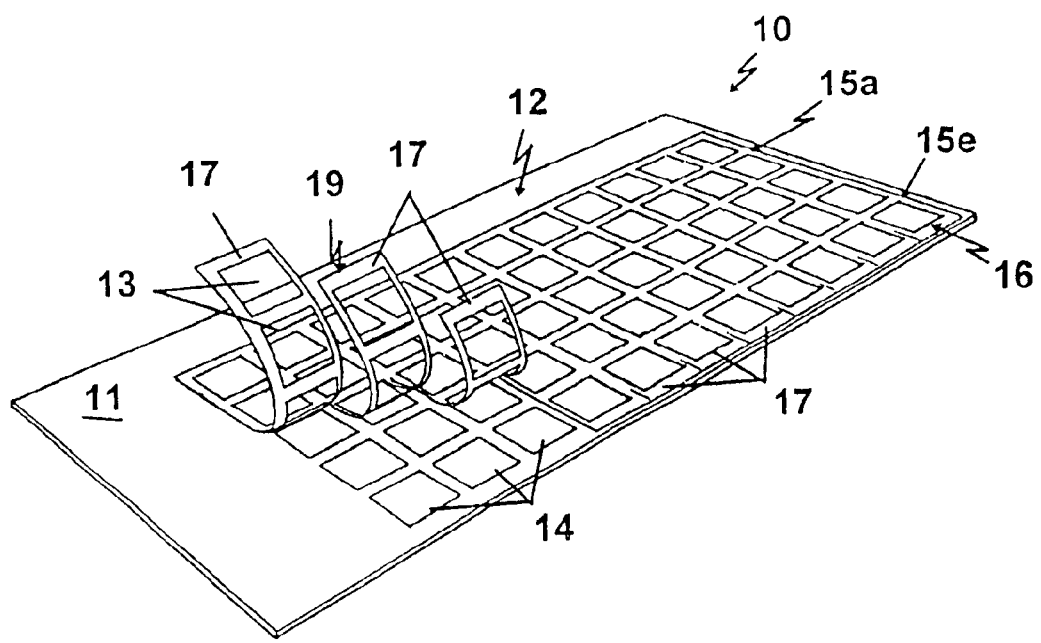
FIG. 1 is a perspective view of an artist's color chart device according to the present invention, shown with peel-off aperture strips.

In the following description, like reference characters designate like or corresponding parts throughout the several views. Also, in the following description, it is to be understood that such terms as "front," "back," "within," and the like are words of convenience and are not to be construed as limiting terms. Referring in more detail to the drawings, the invention will now be described.

Turning first to FIG. 1, a generally rectangular-shaped artist's color chart device according to the present invention, which is generally referred to herein as 10, comprises a durable, substantially planar board portion 11 with spaced apart, matching outlined shapes 14 marked on its upper surface, and an upper sheet portion 12 attachable to the upper surface of the board portion 11. The upper sheet portion 12 has a number of spaced apart, through apertures 13 corresponding to the outlined shapes 14. The board portion 11 is made of a durable, paintable material, preferably a relatively flexible white plastic material with a dull matte finish on its upper surface, and most preferably a coated, acid neutral illustration board. In FIG. 1, the outlined shapes 14 and the corresponding apertures 13 are evenly spaced;apart and same sized.

The apertures 13 and outlined shapes 14, which are generally square-shaped in this preferred embodiment, are arranged in rows 15 and columns 16. The rows 15 extend in a horizontal direction, and the columns 16 extend in a vertical direction. In the preferred embodiment depicted in FIG. 1, there are an odd number of columns 16, and rows 15, although an even number of columns or rows would also be suitable herein.

Continuing to refer to FIG. 1, the flexible, disposable upper sheet portion 12 is removably attachable to the upper surface of the board portion 11. In the embodiment depicted in FIG. 1, the upper sheet portion 12, like the board portion 11, is rectangular in shape. The outlined shapes 14 on the board portion 11 lie immediately below the corresponding apertures 13 when the upper sheet portion 12 is attached to the board portion 11.

Where the upper sheet portion 12 is transparent or translucent, each outlined shape 14 can be seen through the flexible sheet material along the edges of the same sized, corresponding aperture 13. Alternatively, the upper sheet portion is a neutral gray color so that it does not interfere with the artist's color perception. It is believed that a stark white upper sheet portion may inhibit proper observation of color values, and therefore the learning experience. The board portion is preferably also neutral gray for the same reason.

The removable upper sheet portion 12 has an adhesive 19 on its bottom face, so that the upper sheet portion is removably attachable to the upper surface of the board portion 11. Any suitable adhesive, such as a pressure sensitive adhesive, that allows easy attachment and detachment of the thin sheet material may be employed. Removably fastening the upper sheet portion 12 to the upper surface of the board portion 11 in this manner helps to prevent bleeding of the paint between the sheet material and the board, and leaves the edges of the painted outlined shapes 14, crisp. Any suitable paint may be utilized, including watercolors, oils, pastels, and acrylics.

As shown in FIG. 1, the upper sheet portion 12 is scored or otherwise divided between columns 16, forming multiple side by side sheet portion strips 17. This is advantageous in that one straight strip 17 at a time may be neatly peeled off. When a user has finished painting the apertures 13 within one column 16, the user peels away the strip 17 covering that column of painted outlined shapes 14 and disposes of it. The column of painted outlined shapes, each with clean edges, is then clearly visible. This allows immediate feedback for the,artist. It allows the artist to decide when to reveal the painted shapes. Since the artist generally explores a mixture of the dominant color with one other color of the chosen palette in each column, removing a strip 17 each time the color mixture is changed is logical and neat. For the embodiment of FIG. 1, for example, the artist chooses a palette of eleven different colors, e.g., raw sienna, vermilion, etc. Peel-off strips 17 are particularly well-suited for the artist who has completed some of the columns 16 of a color chart 10, and plans on completing the color chart the next day. The adhesive 19 on the strips 17 leaves no residue on the board portion 11 when the strips are peeled off.

Figure 2:
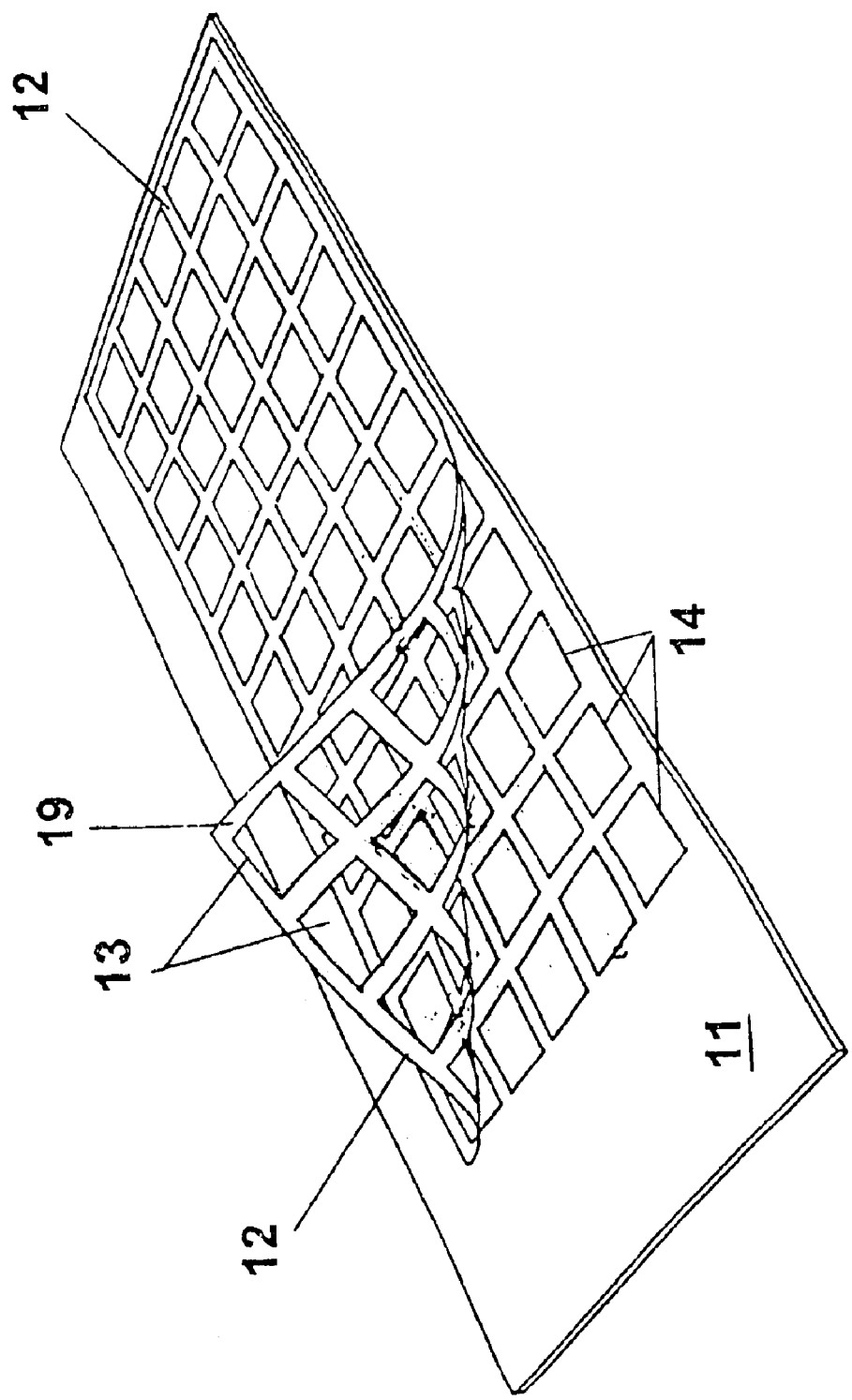
FIG. 2 is a perspective view of an alternate embodiment of an artist's color chart device according to the present invention, shown with a one piece peel-off aperture sheet portion.

FIG. 2 shows an alternate, preferred color chart device 10 having a one-piece upper sheet portion 12 that peels off once the apertures 13 have been filled in with the appropriate color values. This is a very quick procedure, especially when compared with the previous conventional process of taping, painting, and untaping boards. The used upper sheet portion 12 is disposed of in an appropriate manner. The adhesive 19 on the bottom face of the upper sheet portion 12 leaves no residue on the board portion 11 when the strips are peeled off. Clean edges remain behind on the board portion, which is usable as a color reference for years thereafter.

Figure 3:
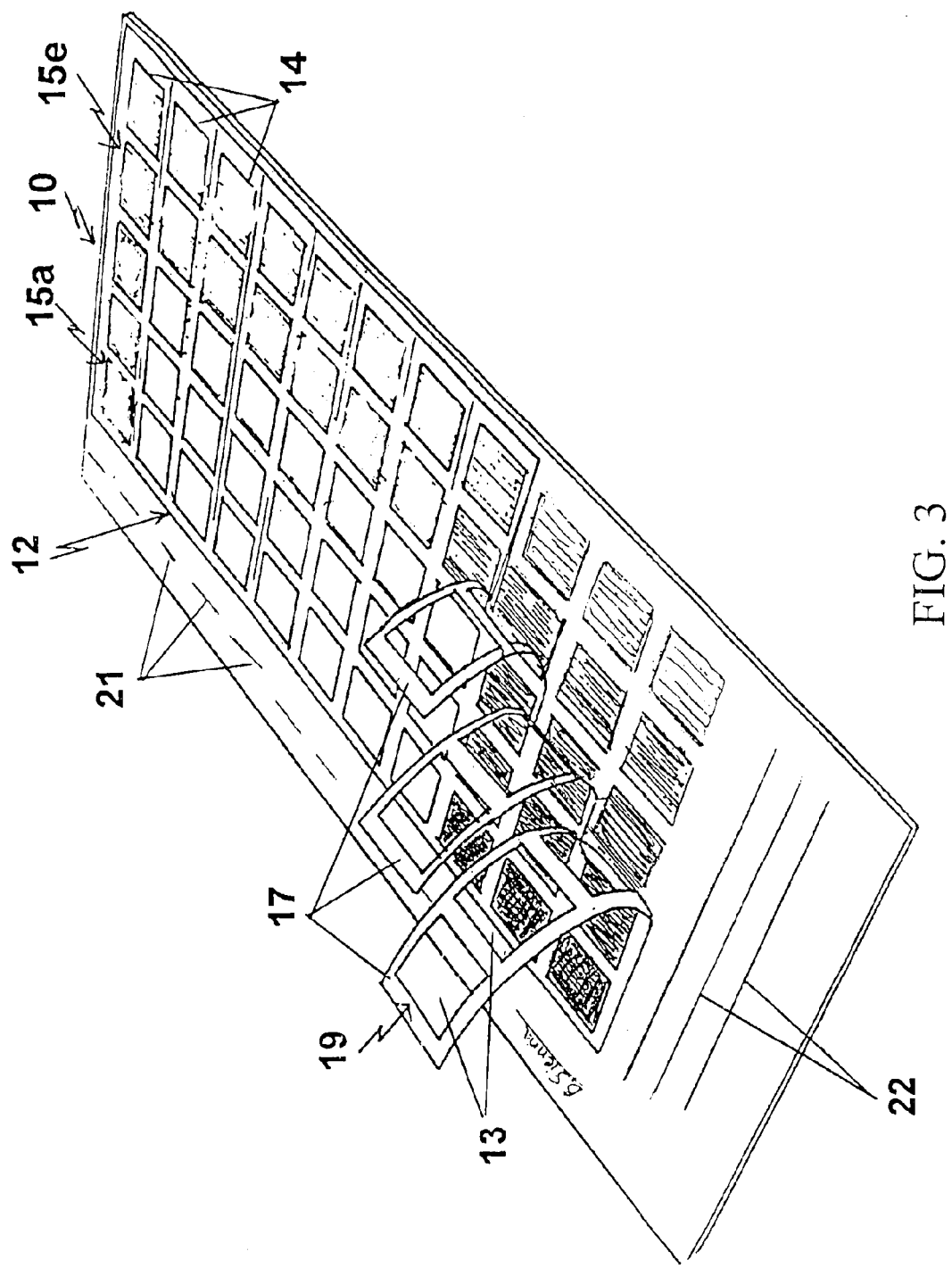
FIG. 3 is a perspective view of an artist's color chart device according to the present invention, shown with peel-off aperture strips.

Referring to FIGS. 1 and 3, the color chart device 10 comprises the same number and arrangement of outlined shapes 14 and apertures 13. Eight to twelve columns, and five to seven rows are most preferred. This columnar arrangement is advantageous because it allows a variety of the artist's favorite colors (eight to twelve) to be chosen for investigation in each color chart. An odd number of apertures in a column, preferably five or seven, has been found to be ideal for showing off the color values, since the middle color value is approximately halfway between the uppermost square in the column and the lowermost square in the same column. The apertures may have any shape, including squares, ellipses, ovals, and circles.

As seen in FIG. 3, the uppermost painted shape 14 in each column 16 in the color chart device 10 is the darkest value, since it is painted with a selected color straight from the tube mixed with the dominant color for that chart straight from the tube (i.e., without dilution by white). Then for each descending square, the value of the mixture is lightened with white. The lowermost painted square (at the bottom of the color chart) is the faintest value, since it contains the least amount of the selected color mixture. The middle painted square in thee column is halfway between the uppermost and lowermost painted outlined shapes (here, squares). Thus, each outlined shape 14 in the first row 15a across the top of the color chart, once the chart is complete, shows each of the colors of the palette as it interacts with the dominant color chosen for investigation in that color chart.

Also, each outlined shape 14 in the last row 15e across the bottom of the completed color chart 10 will show the lowest possible value for the mixture and will be nearly white. a Although white is preferred, black or neutral gray paint may be used instead of white. Again, the adhesive 19 on the bottom face of the upper sheet portion 12 leaves no residue on the board portion 11 when the upper sheet portion is removed.

Additionally, the board portion 11 comprises a blank first information line 21 at the top of each column of outlined shapes 14 for labeling a color for that column 16, such as "Burnt Sienna", "Cadmium Yellow", or "Windsor Blue". As seen in FIG. 3, the board portion 1I also includes blank second lines 22 along one side of the board portion 11 for writing down other relevant information with any suitable writing implement, such as a pen, pencil, or marker. This area may also be used for printing marketing insignia, logos, or the like.

Figure 4:
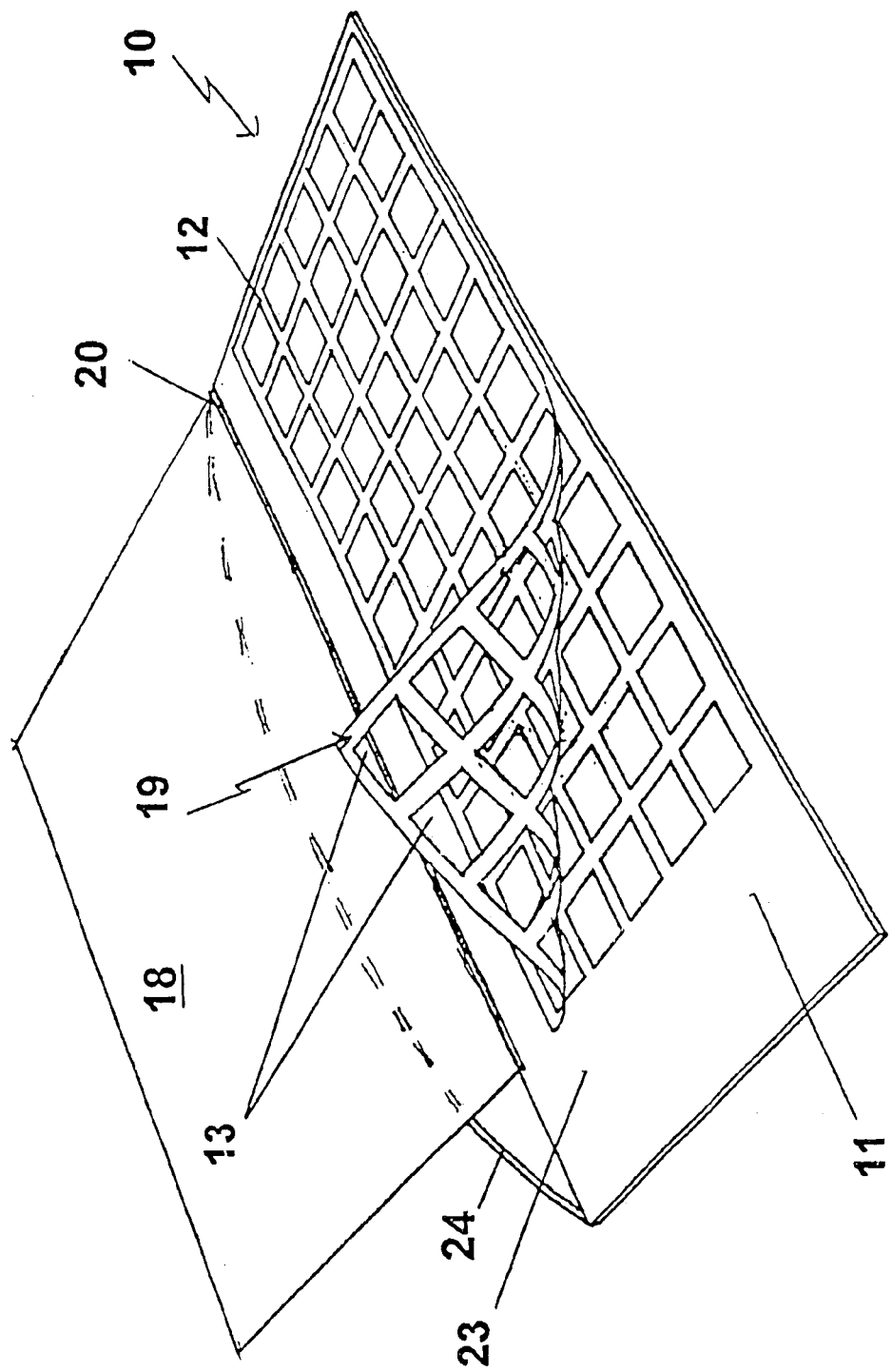
FIG. 4 is a perspective view of an alternate embodiment of an artist's color chart device according to the present invention, shown with a sheet portion binding and handle.

Turning to FIG. 4, the color chart device 10 further includes a protective cover panel 18 and a flexible a handle 24, which is attached at its opposite ends to corners of the board portion 11. Using the handle 24, a color chart device 10 may be hung on a hook on a wall. Since the handle 24 is collapsible, it does not interfere with stacking several color chart devices 10 on top of one another. The handle 24 is also useful for carrying one or more color chart devices 10.

In regard to the cover panel 18 shown in FIG. 4, the cover panel 18 preferably has the same size and shape as the part of the board portion 11 that is covered with the painted shapes. The cover panel 18 is preferably transparent, so that the paints on the board portion are visible through it. Once the upper sheet portion 12 has been discarded and the paint dries, the user overlaps the cover panel 18 over the board portion 11 in order to provide some protection from paint discoloration, damage by leaks or spills, or other damage over time. The cover panel 18 is particularly useful as a protective barrier where a number of color chart devices 10 are stacked on top of one another. The cover panel 18 is also particularly useful as a protective barrier when the paint is of a fragile nature, such as pastels, oil sticks, or crayons. A clear acetate with ultraviolet resistance is a preferred cover panel material.

In FIG. 4, an edge of the cover panel 18 is attached to a corresponding edge of the board portion 11, preferably by a cover panel binding 20. An alternative embodiment includes removable adhesive on the bottom face of a separate cover panel 18, so that the cover panel can be removably attached to the board portion 11 once the paint has fully dried.

Figure 5:
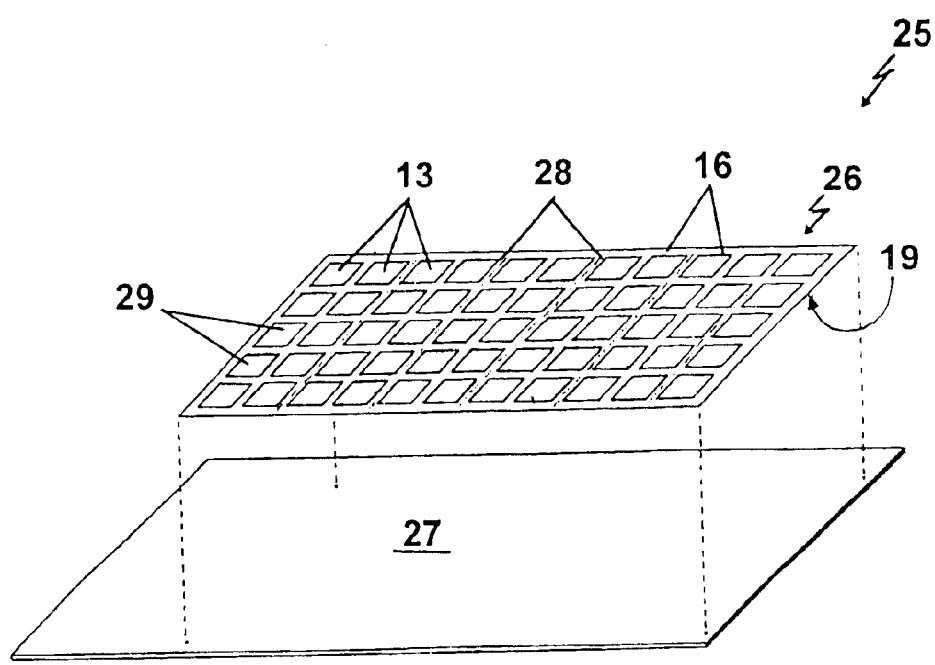
FIG. 5 is a perspective view of a removable sheet device according to the present invention, shown above a board.

Turning to FIG. 5, the present invention also contemplates a removable sheet device 25 for guiding lines in an artist's color chart. The sheet device includes the apertures 13 arranged in spaced apart rows and columns on a flexible, paintable sheet of material, and an adhesive 19 on a lower face of the sheet of material 26 between the apertures 13. The sheet device is removably attachable to an upper surface of any suitable, unmarked artist' board 27, as shown in FIG. 5. The sheet device 25 preferably includes a similarly sized disposable sheet of paper backing 29 covering the adhesive lower face. The backing 29 is peeled off and discarded prior to adhesion to the artist's board 27. The sheet of material 26 is preferably translucent or transparent, or a neutral gray color, which may be a better contrast for detecting the nuances of different color values. The sheet device may be used as described herein.

Continuing with FIG. 5, the peel-off strips are preferably divided by at least one perforated line 28 extending through the material sheet 26 between at least two of the columns 16 of apertures 13. The perforated lines 28 form six side by side sheet portion strips 17. This is advantageous in that one strip 17 at a time may be neatly peeled off. When a user has finished painting the apertures 13 within one or two columns 16, the user peels away the straight strip 17 covering those column(s) and disposes of it. The columns of painted squares, each with clean edges, are then clearly visible.

Figure 6:
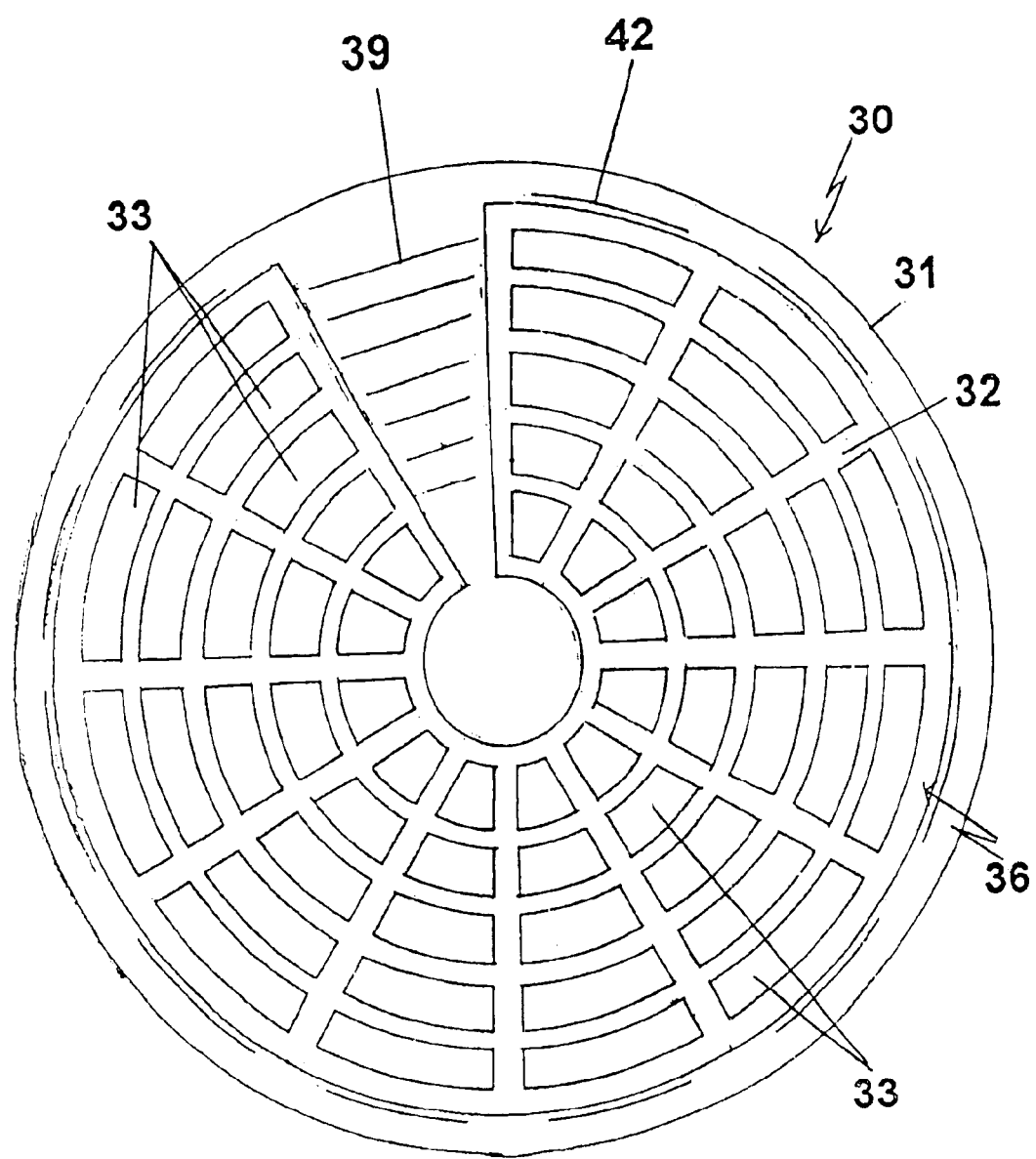
FIG. 6 is a top plan view of a circular-shaped artist's color chart device according to the present invention.

In an alternate, generally circular-shaped embodiment 30 depicted in FIG. 6, a generally circular upper sheet portion 32 with a number of quadrilateral-shaped apertures 33 overlies a generally circular, same-sized board portion 31, which is visible through the apertures in FIG. 6. The apertures 33 are arranged in an annular arrangement of columns 36. Each column is generally conical in shape and radiates out from the center of the chart device. The apertures 33 in each column gradually decrease in size toward the center of the chart 30. This is advantageous in that it teaches the student user scale in addition to color values. The circular board portion 31 also preferably includes indicia 39 printed in a blank column for identifying the dominant or selected colors of that particular chart.

To use the artist's color chart device 30, the user mixes a certain amount of the selected dominant color with a certain amount of a second color from the student's palette, and then mixes in the white paint according to the value desired for each square. The user then applies each paint mixture to the board portion 31 through each aperture 33.

As the user travels down the board portion 31 within a column 36 painting the apertures 33, the amount of white paint in the mix increases in increments from the outermost aperture 33 to the innermost aperture 33 in each column 36. Thus, within a column 36, each successive aperture 33 underneath the top aperture receives a shade of paint with a lighter value.

The user need not be overly concerned about confining the paint to the apertures 33 because the upper sheet portion 32 protects the areas of the board portion 31 that are not exposed by the apertures 33. Once the user finishes painting the different values within the apertures 33, he or she detaches the upper sheet portion 32 from the board portion 31 and discards the upper sheet portion 32. The adhesive on the lower face of the upper sheet portion 32 adheres the upper sheet portion to the board portion 31, so bleeding of the paint is minimized. The painter is left with a guide having neatly outlined shapes that he or she can use as a color reference for years to come. Normally, about a dozen artist's color charts 30 with a wide variety of dominant colors are completed by the student. The artist's color chart device is preferably purchased in sets of six (6) or twelve (12) color chart devices so as to illustrate a wide variety of often used (dominant) colors.

Figure 7:
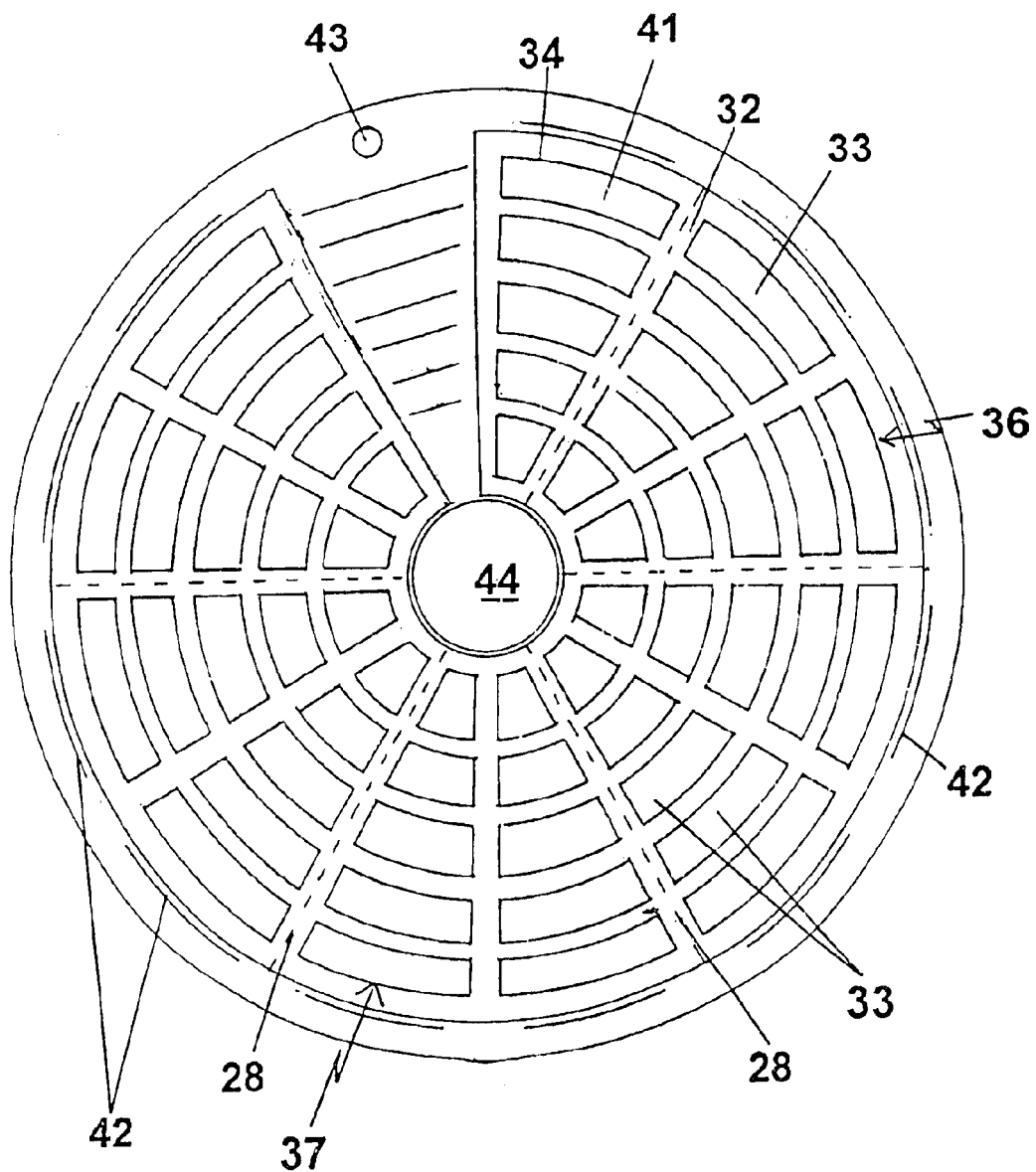
FIG. 7 is a top plan view of an alternate embodiment of a circular-shaped artist's color chart device according to the present invention, shown with peel-off strips and a central hole.

In a second circular-shaped embodiment shown in FIG. 7, the board portion 41 and the one-piece upper sheet portion 32 are generally circular in shape, with the latter superimposed on the former and held in place by means of an adhesive layer on the bottom face of the upper sheet portion. The upper sheet portion is divided into strips by five perforated lines 28, with two or three columns 36 in each strip. When a user has finished painting the apertures 33 within a set of three columns 36, the user peels away the corresponding strip 37 of the upper sheet portion 32 covering that section of the board.

Blank, curved first indicia lines 42 are located on the board portion 41 above each column 36 for labeling a dominant color for that column. The device preferably includes a hole 43 along its edge for hanging the board on the wall, if desired. Optionally, a circular cover panel 38 resembling a snap-lock plastic lid may be slipped over the circumference of the board portion 31, 41 after detachment of the upper sheet portion 32 from the board portion 31, 41.

Continuing with FIG. 7, the upper sheet portion 32 and underlying board portion 41 include a generally circular central hole 44, which is at least two inches in diameter so several fingers can be inserted from the bottom of the color chart device. This central hole 44 gives the artist the option of holding the color chart device during painting, if the artist desires to do so. It also avoids having an unused central area in the color chart device, where apertures would be too small to be useful.

This circular embodiment of the instant color chart device is also aesthetically pleasing. The color chart device has an annular arrangement of columns centered around a central hole, with each column being made up of stepped, square impressions. The generally rectangular apertures 33 in the present upper sheet portion 32 are slightly smaller than the outlined shapes 34 marked on the board portion 41. Since the apertures 33 are optionally smaller than the outlined shapes 34, the finished, painted rectangles can have a stepped, or outlined, appearance. With this circular arrangement, the student gains an appreciation of color harmony in a scaled setting. The upper sheet portion is preferably transparent, as shown in FIG. 7.

Figure 8:
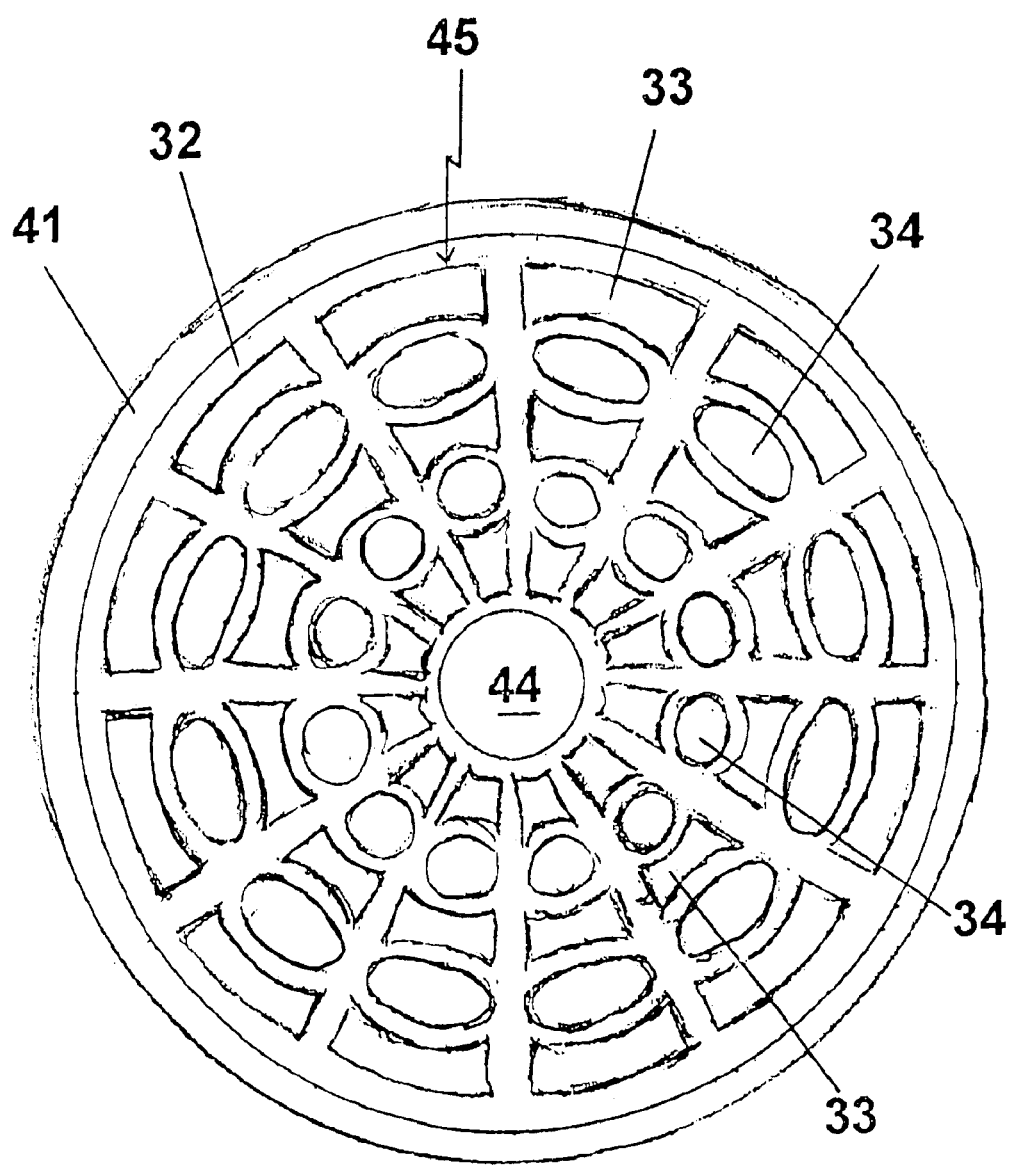
FIG. 8 is a top plan view of an alternate embodiment of a circular-shaped artist's color chart device according to the present invention, showing alternating aperture shapes.

FIG. 8 depicts yet another alternate, aesthetically pleasing embodiment of the artist's color chart device. In this embodiment, the board portion 41 and upper sheet portion 31 are generally circular in shape. Here, some of the apertures 33 are quadrilateral in shape, and some are oval 34 in shape. The quadrilateral-shaped apertures 33 generally alternate with the oval-shaped apertures 34 to provide general exposure to shape and scale and variety, which is important for the artist painting a number of color charts. Different aperture shapes may be used. The board portion 31 and upper sheet portion 32 comprise an annular arrangement of generally conical-shaped sections 45, which in turn each comprise a single column of outlined shapes (board portion) or apertures 33, 34 (upper sheet portion). Each conical-shaped section 45 depicts a different shade of one dominant color mixed with the diminished color, which is preferably white. The upper sheet portion 32 may be perforated or otherwise sectioned into conical-shaped strips, in which each strip corresponds to a conical-shaped section 45, as in the embodiment shown in FIG. 7.

Also included herein is a method of using an artist's color chart device 10, 30, comprising the steps of:
(a) painting the outlined shapes 14, 34 on the board portion 11, 31, 41 which are exposed by the apertures 13, 33, with a related series of graduated color values in each column 16, 36, with a different color series in each of the rows;
(b) detaching the upper sheet portion 12, 32 from the board portion 11, 31, 41 and disposing of it; and
(c) allowing the painted board portion 11, 31, 41 to dry. The method may further include an initial step of. (a1) removably attaching an upper sheet portion 12, 32 to a board portion 11, 31, 41, so that a plurality of apertures 13, 33 on the upper sheet portion 12, 32 correspond to and overlay a plurality of corresponding outlined shapes 14, 34 on the board portion, the apertures 13, 33 and the outlined shapes 14, 34 being in the same arrangement of rows 15 and columns 16, 36 as one another. The method preferably further includes the step of: removably attaching a cover panel 18, 38 to the board portion 11, 31, 41 after detaching the upper sheet portion 12, 32 from the board portion 11, 31, 41.

From the foregoing it can be realized that the described device of the present invention may be easily and conveniently utilized as an artist's color chart device, or method of using it. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An artist's color chart device, comprising:
   (a) a board portion leaving a paintable upper surface;
   (b) a flexible, removable, disposable, peel-off upper sheet portion comprising an adhesive on its lower face, the upper sheet portion being removably attachable to the upper surface of the board portion; and
   (c) a plurality of similarly shaped apertures arranged in a plurality of spaced apart rows and generally vertical columns in the upper sheet portion.

2. The color chart device according to claim 1, further comprising a plurality of spaced apart outlined shapes marked on the upper surface of the board portion, the outlined shapes having substantially the same shape and arrangement as the apertures; and wherein the apertures overlie the outlined shapes when the upper sheet portion is attached to the board portion.

3. The color chart device according to claim 1, wherein the upper sheet portion is divided into peel-off strips, each strip being individually removable from the board portion.

4. The color chart device according to claim 2, wherein the board portion and upper sheet portion are each generally rectangular in shape, and the rows generally extend horizontally.

5. The color chart device according to claim 4, wherein the upper sheet portion is removably attached along one edge to a corresponding edge of the board portion.

6. The color chart device according to claim 2, wherein the apertures and outlined shapes are generally rectangular in shape.

7. The color chart device according to claim 4, wherein there are five or seven of the rows, and between eight and twelve of the columns.

8. The color chart device according to claim 1, further comprising a removable cover panel attached along one edge to a corresponding edge of the board portion for covering the upper surface of the board portion.

9. The color chart device according to claim 1, wherein the board portion and upper sheet portion are each generally circular in shape.

10. The color chart device according to claim 9, wherein the apertures are arranged in an annular arrangement of columns, each successive row of apertures decreasing in size, with the largest apertures closest to a periphery of the board portion, and the smallest apertures adjacent a center of the board portion.

11. The color chart device according to claim 10, further comprising a circular central hole in the center of the board portion, the central hole having at least a two inch diameter.

12. The color chart device according to claim 9, wherein the upper sheet portion is divided into peel-off strips, each strip being individually removable from the board portion.

13. The color chart device according to claim 12, wherein the apertures are arranged in an annular arrangement of columns, with a generally circular central hole through the color chart device.

14. The color chart device according to claim 12, further comprising a blank first line above each of the columns on the board portion for labeling a dominant color for each column.

15. The color chart device according to claim 2, wherein the upper sheet portion is one-piece and made of a transparent or translucent material.

16. The color chart device according to claim 15, wherein the apertures are slightly smaller than the outlined shapes, providing a stepped, outlined appearance to the final painted shapes.

17. A removable sheet device for guiding lines in an artist's color chart, the sheet device comprising: a plurality of apertures arranged in a plurality of spaced apart rows and generally vertical columns on a flexible sheet of material, and an adhesive on a lower face of the sheet of material between the apertures; the sheet of material being divided into peel-off strips, each strip being individually removable from the rest of the sheet; the sheet device being removably attachable to an upper surface of an artist's board.

18. The sheet device according to claim 17, wherein the sheet of material is circular in shape.

19. The sheet device according to claim 18, wherein the peel-off strips are divided from one another by at least one perforated line extending through the sheet of material between at least two of the columns of apertures.

20. The sheet device according to claim 17, further comprising a peel-off sheet of paper backing covering the adhesive lower face of the sheet of material.

\* \* \* \* \*